(No Model.) 8 Sheets—Sheet 1.
H. B. DENNY.
CYLINDER PRINTING MACHINE.

No. 364,223. Patented June 7, 1887.

WITNESSES
Chas. H. Baker.
Jas. L. Falbey.

H. B. Denny
INVENTOR

H. J. Ennis
Attorney (No Model.)

8 Sheets—Sheet 2.

H. B. DENNY.
CYLINDER PRINTING MACHINE.

No. 364,223. Patented June 7, 1887.

WITNESSES
Chas. Baker.
Jas. L. Halley

H. B. Denny
INVENTOR

H. J. Ennis
Attorney (No Model.)

8 Sheets—Sheet 3.

H. B. DENNY.
CYLINDER PRINTING MACHINE.

No. 364,223. Patented June 7, 1887.

WITNESSES
Chas. N. Baker.
Jas. L. Falbey

H. B. Denny
INVENTOR

H. J. Ennis
Attorney (No Model.) H. B. DENNY. 8 Sheets—Sheet 4.
CYLINDER PRINTING MACHINE.

No. 364,223. Patented June 7, 1887.

WITNESSES
Chas. H. Baker
Jas. L. Falley

INVENTOR
H. B. Denny
H. P. Ennis, Attorney (No Model.) 8 Sheets—Sheet 5.

H. B. DENNY.
CYLINDER PRINTING MACHINE.

No. 364,223. Patented June 7, 1887.

WITNESSES
Chas. H. Baker
Jas. L. Falbey

H. B. Denny
INVENTOR

Attorney (No Model.) 8 Sheets—Sheet 6.
H. B. DENNY.
CYLINDER PRINTING MACHINE.
No. 364,223. Patented June 7, 1887.
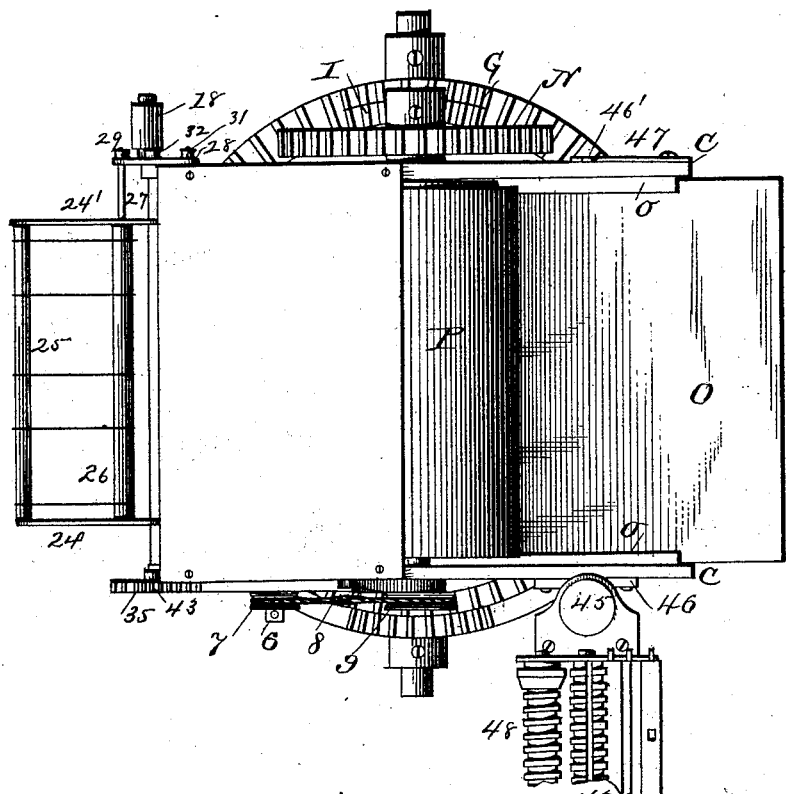
Fig. 9.
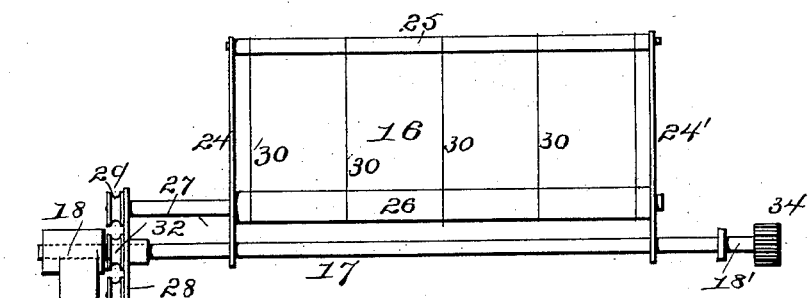
Fig. 10.
Fig. 11.
WITNESSES
Chas. H. Baker
Jas. L. Falvey
H. B. Denny
INVENTOR.
H. J. Ennis
Attorney
N. PETERS, Photo-Lithographer, Washington, D. C.

(No Model.) 8 Sheets—Sheet 7.
H. B. DENNY.
CYLINDER PRINTING MACHINE.

No. 364,223. Patented June 7, 1887.

WITNESSES
Chas. H. Baker.
Jas. L. Halvey.

INVENTOR
H. B. Denny
H. J. Ennis
Attorney

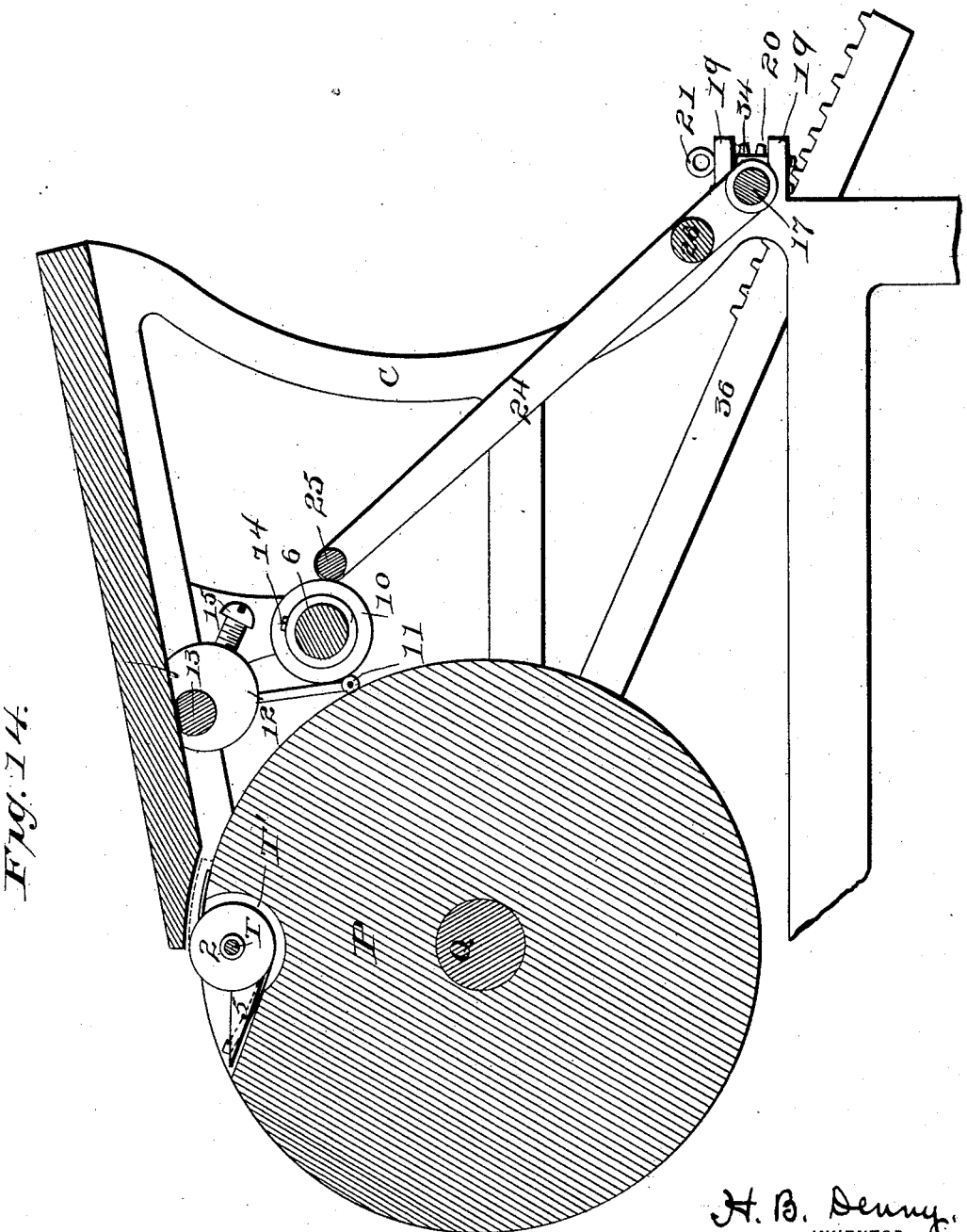

UNITED STATES PATENT OFFICE.

HERVEY B. DENNY, OF WASHINGTON, DISTRICT OF COLUMBIA.

CYLINDER PRINTING-MACHINE.

SPECIFICATION forming part of Letters Patent No. 364,223, dated June 7, 1887.

Application filed August 2, 1883. Serial No. 104,392. (No model.)

*To all whom it may concern:*

Be it known that I, HERVEY B. DENNY, a citizen of the United States, residing at Washington, in the District of Columbia, have invented certain new and useful Improvements in Cylinder Printing-Machines, of which the following is a specification, reference being had therein to the accompanying drawings.

My invention has relation to improvements in printing-presses, and more particularly to that class known to the trade as "cylinder-presses," and the object of the invention is to produce a press that will be simple in construction, compact in arrangement, and capable of being operated with the greatest facility; and to these ends the novelty consists in the construction and arrangement of the same, as will be hereinafter more fully described.

In the accompanying drawings the same letters of reference indicate the same or like parts of the invention.

Figure 1:
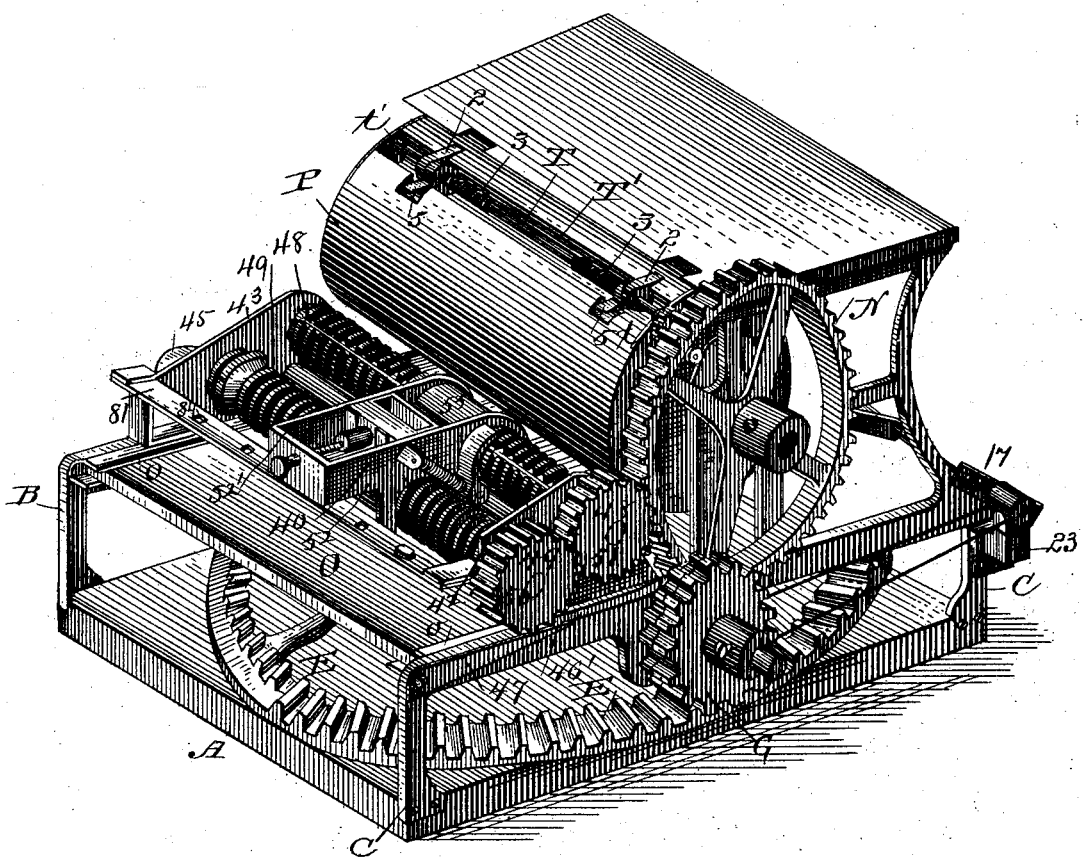
Figure 2:
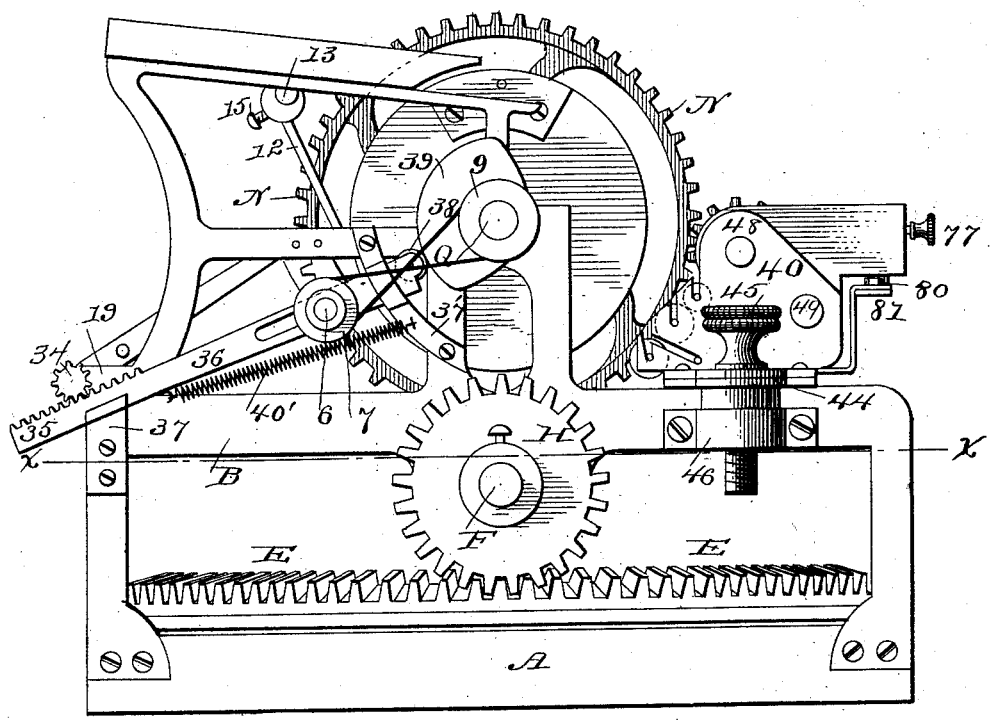
Figure 3:
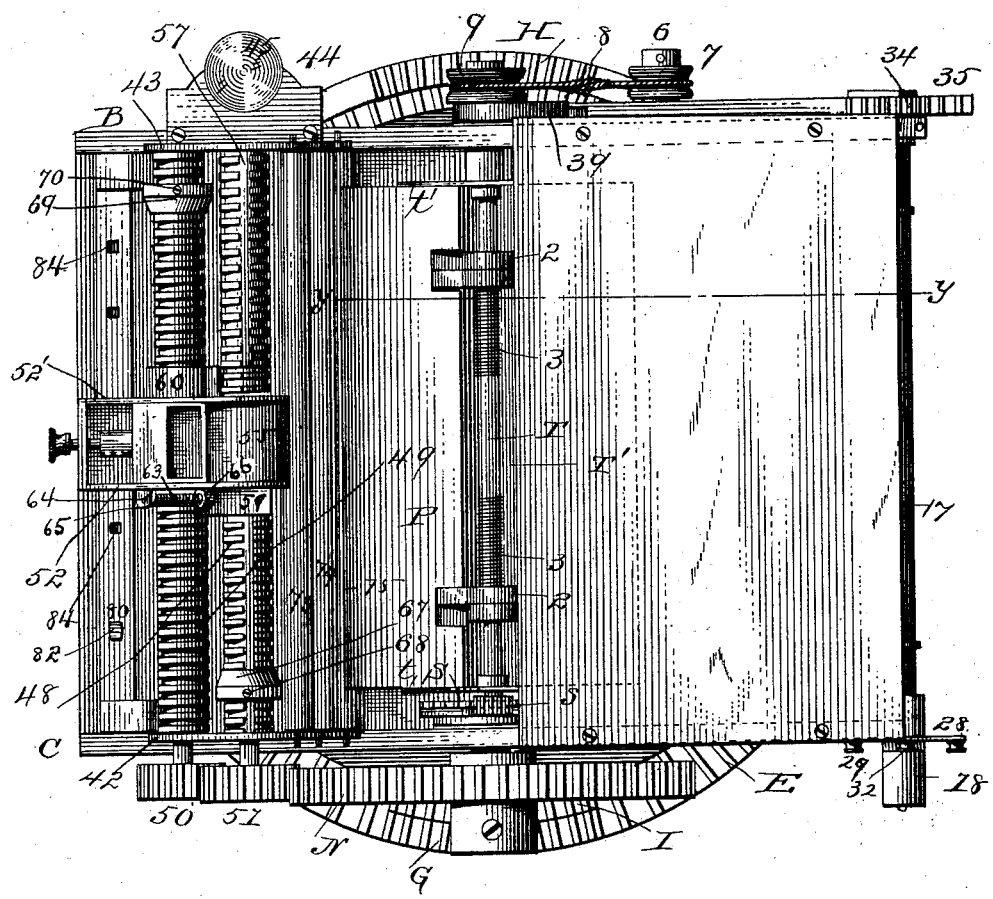
Figure 4:
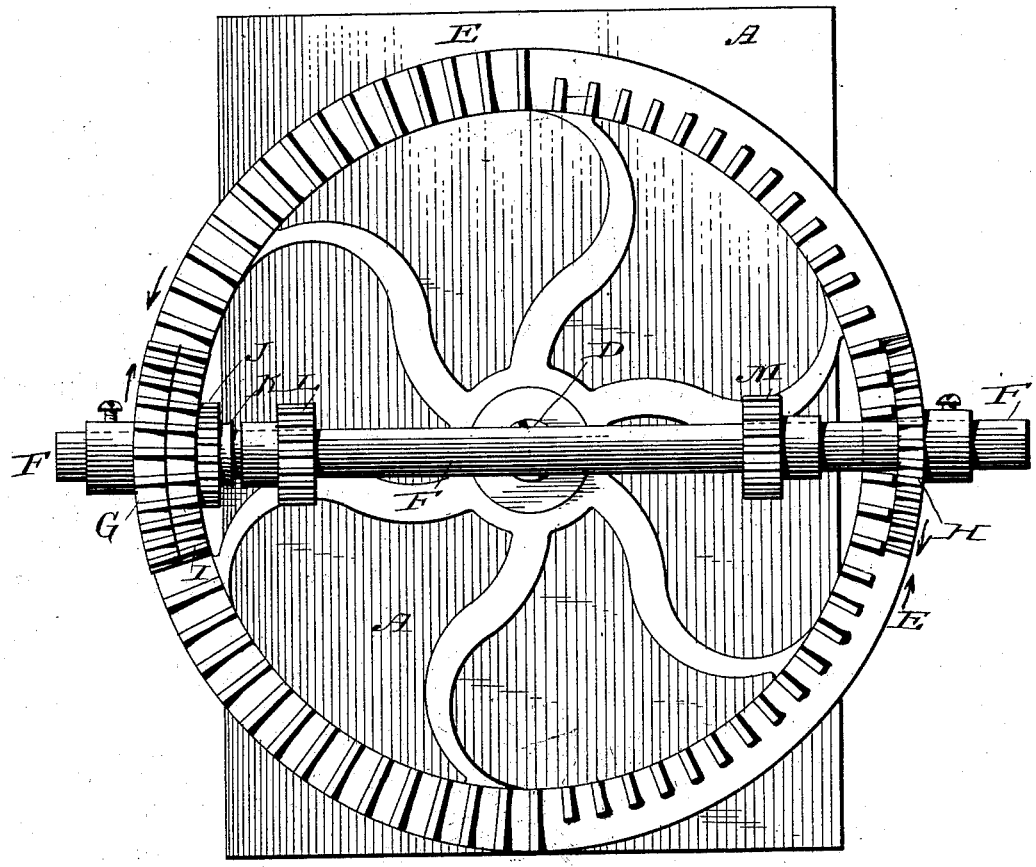
Figure 5:
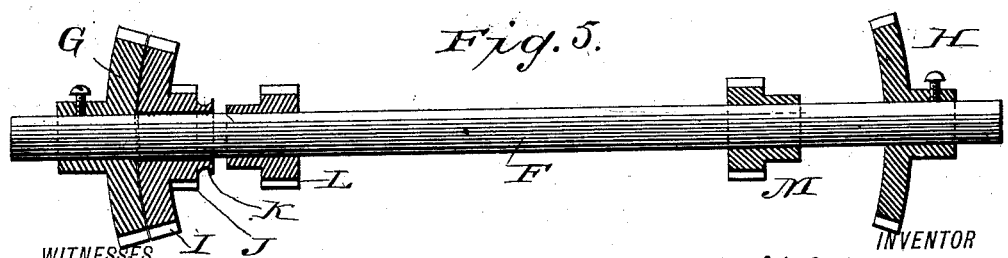
Figure 6:
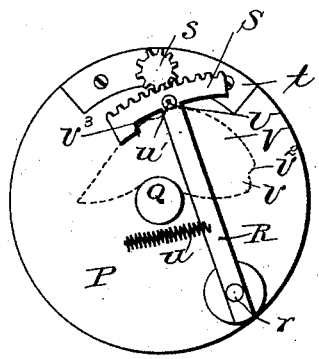
Figure 7:
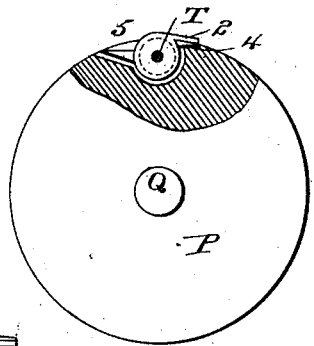
Figure 8:
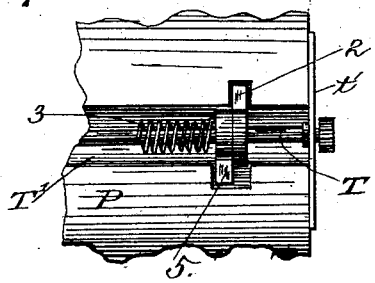
Figure 12:
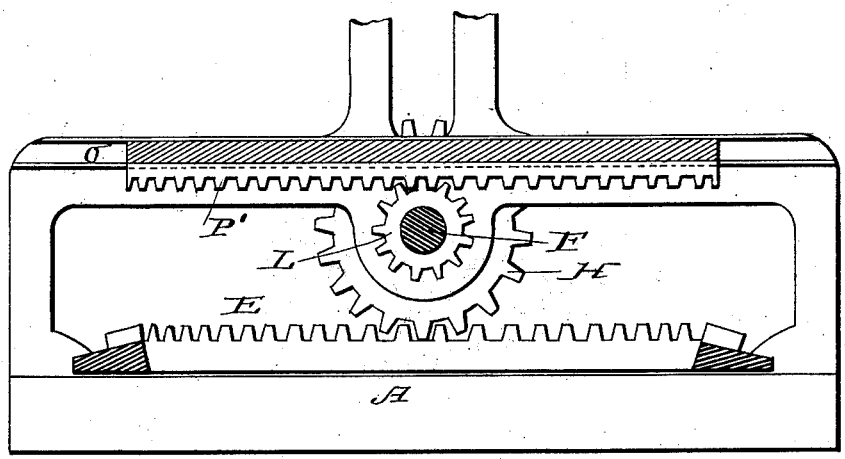
Figure 13:
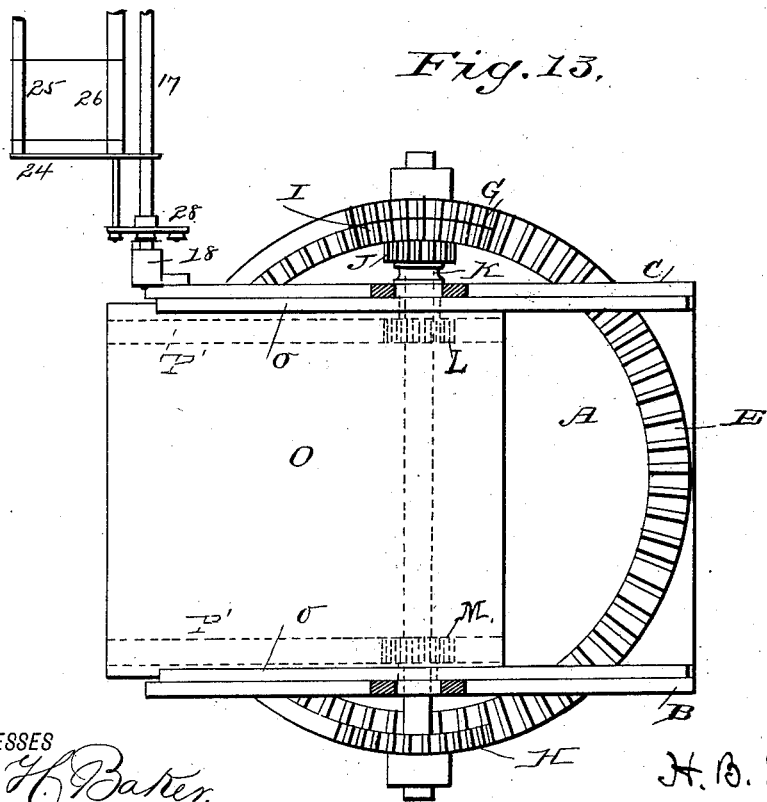

Figure 1 is a perspective elevation of my improved cylinder-press. Fig. 2 is a side elevation of the same; Fig. 3, a top plan view; Fig. 4, a plan view of the driving mechanism; Fig. 5, a longitudinal view of the main driving-shaft with the gears mounted thereon shown in section. Fig. 6 is an end view of the cylinder, showing the finger-operating mechanism. Fig. 7 is a cross-section through the cylinder on the line of a pair of the fingers. Fig. 8 is a plan view of the fingers and the springs on the finger-shaft. Fig. 9 is a top plan view of the press, with the type-bed at the extreme forward end of its stroke and the ink-fountain swung around out of the way, to permit free access to all parts of the form from the front of the press. Fig. 10 is an elevation of the fly removed from the machine. Fig. 11 is a side view of the fly-driving mechanism. Fig. 12 is an elevation, partly in section, of the bed and base along the line of one of the bed-racks. Fig. 13 is a plan view through the line $x\ x$ of Fig. 2; and Fig. 14 is a section through the line $y\ y$, Fig. 3, of the paper-delivery mechanism.

A is the base, and B C are the sides, which are bolted to the base and form the framework of the machine. To the center of the base A is secured a stud, D, which forms the journal for the main driving-gear E, which has imparted to it a continuous rotary motion from the engine. Journaled in the frame B C is the main shaft F, to the ends of which are rigidly secured the gears G H, which mesh in the driving-gear E.

I is a gear-wheel having secured to one side thereof a smaller gear, J, provided with a pulley, K, all of which are made of one piece and loosely mounted upon the shaft F, so as to turn freely thereon.

L and M are small gears rigidly secured to the shaft F.

When the main driving-gear E is continuously rotated in one direction, the gear-wheel I engages the inner circle of teeth upon the face of the driving-gear E, which forms an unbroken series, and consequently the said gear I, the gear J, and pulley K all have a continuous motion in the same direction.

The gears G and H alternately engage the outer half-circle of teeth upon the gear-wheel E, and the teeth being removed from one-half of the wheel, when the gear G is engaged with the wheel E, the other gear, H, is free, and vice versa. The object of this construction is to produce a continuous motion in one direction in the cylinder, which is provided with a large gear-wheel, N, meshing into the smaller gear J, and at the same time produce a reciprocating motion in the bed O, which is provided with two racks, P' P', driven by the small gears L and M; and as these gears are rigidly secured to the shaft F it is first rotated in one direction by the gear G, driven by the half-circle of teeth on the driving-wheel E, then in the opposite direction by the gear H, driven by the main wheel E, which alternately engages the gears G and H, as above set forth. It will thus be seen that while the cylinder rotates continuously in one direction the bed has a reciprocating movement at the same time.

The bed O runs in guides $o\ o$ on the inside of the frame B C, so as to travel freely to and fro under the cylinder.

P is the cylinder, mounted upon a shaft, Q, journaled in the frame B C, above the main driving-shaft F, and one end of said cylinder-shaft has the gear-wheel N, which gives motion to the cylinder from the small gear J on the shaft F.

On one end of the cylinder P is secured a lever, R, fulcrumed at r, and its free end is provided with a curved rack, S, meshing in pinions s on the outer end of the rock-shaft T, journaled in the plates t t' on the opposite ends of the cylinder P. The lever R is provided with a retractile spring, u, which retains it in its normal position, that being shown in Fig. 6.

U is a friction-roller mounted upon the stud u' on the side of the rack S, and as the cylinder, lever, pinion, and shaft T revolve this friction-roller U comes into contact with a mutilated cam, V, which is rigidly secured to the frame C. This motion causes a momentary stop in the rack S, which produces a half-revolution of the pinion s and shaft T, and the roller U then rides upon the periphery of the cam V, and, after passing over, the spring retracts the levers R, which brings the rack, pinion, and shaft T to their normal positions.

The shaft T lies in a longitudinal groove, T', in the cylinder P, and rigidly secured to it are a series of fingers, 2 2, which are held normally closed by the springs 3 3, coiled around the shaft T, and secured, respectively, at their ends to the said shaft and the stops 5 5, above mentioned; but when the said shaft is partially rotated, by means of the pinion s, rack S, and lever R, above described, then the fingers 2 2 open, so as to admit the sheet of paper from the table, and when the shaft returns to its normal position the fingers are closed, as shown in Fig. 7, so as to grasp the paper and carry it around the cylinder. These fingers 2 2 close upon jaws 4 4, which are loosely mounted upon the shaft T, and these jaws each have a projecting stop, 5, which allows a partial motion of the fingers and jaws when closed, to raise the paper above the line of the periphery of the cylinder. The jaw 4 and the stop 5 are made of one piece, and so arranged with reference to the groove T' that when the jaw 4 touches the cylinder on its side of the groove the stop is raised a short distance from the side of the groove, so that if it were pressed back until it stopped against the side of the groove the jaw 4 and finger 2 would be raised beyond the periphery of the cylinder. These motions, including the opening and closing of the fingers, are automatically accomplished by the pinion s, rack S, and lever R, as follows:

It will be observed that the lever R is fulcrumed at r tangentially with reference to the center of the cylinder R, and is held in toward the center thereof by the spring u. Of course if said lever be pushed outwardly from the center, the rack S, by an endwise movement, will cause a partial rotation of the shaft T, and consequently open the fingers 2; but as the spring 3 holds the jaw 4 against the finger, the jaw follows the finger for a short distance, or until the stop 5 checks the upward motion of the jaw, which it does as soon as the paper which is between the said jaw and finger is raised beyond the face of the cylinder. The shaft, however, continues its movement, and opens the jaws to release the paper and remain open to receive the new sheet. When the friction-roller U comes in contact with the end v of the cam V, it retards the motion of the rack until it has been pressed far enough from the center of the cylinder to allow the roller to ride over the face of the cam. The first thing accomplished by this retardation of the rack is the joint raising of the jaw and finger, and this being done, the roller U then comes in contact with the point $v^2$, which presses the rack still farther out and opens the fingers to their full extent. When this is done, the roller U is far enough out to ride over the face of the cam, which it does, retaining the fingers in their open position until the roller U comes to the end $v^3$ of the cam, where it then slips off, allowing the lever R to resume its normal position, which closes the fingers upon the new sheet of paper and carries it around the cylinder.

6 is a shaft mounted parallel with the cylinder P in the frame B C, close up under the delivery-table, and said shaft is provided with a pulley, 7, driven by a crossed belt, 8, from the pulley 9 on the cylinder-shaft Q, so as to produce a continuous rotary motion of said shaft 6 in the opposite direction to the rotation of the cylinder. This shaft 6 is provided with a series of wheels, 10, against the periphery of each of which rests one of a series of friction-rollers 11, mounted upon the lower end of each of a series of depending arms, 12, secured to a bar, 13, attached to the frame C underneath the table. These wheels 10 are longitudinally adjustable upon the shaft 6 by means of the set-screws 14, and the arms 12 are adjustable upon the bar 13 by the screws 15, so that the rollers 11 are the ends of the arms, and the wheels 10 can be moved to suit the width of the sheet being printed or the "make-up" of the form.

The sheet being taken by the fingers from the delivery-table is carried around on the cylinder, as above described, until the forward end of it, held by the fingers, is brought to the point where the rollers 11 are in contact with the wheels 10. Just at this point the friction-roller U on the rack S strikes the end v of the cam V and raises the jaws 4 and fingers 2, which carries the end of the sheet out from the face of the cylinder and between the wheels 10 and rollers 11; and as soon as it is entered between them the further motion of the cylinder causes the fingers to release the sheet entirely, and the delivery having been taken up by said wheels 10 and rollers 11, they carry it forward and deliver the sheet to the fly 16, which remains in the position shown until the printed sheet is run upon it, when the fly then swings over and places it upon a table (not shown) placed in position to receive it.

The fly 16 consists of a shaft, 17, one end of which is journaled in a bracket, 18, while the other end is provided with a journal, 18', which has a bearing in the arm 19 of the frame C.

This arm 19 has a slot, 20, into which the journal 18' slips, being retained therein by the removable pin 21. The bracket 18 has a vertical stud, 22, by means of which it is vertically pivoted in the arm 23, so that if the pin 21 be removed the shaft 17 and fly 16 can be swung around clear of the press, as shown in Fig. 13, to allow the operator free access to all parts of the form from that end of the press.

24 24' are arms rigidly secured to the shaft 17, and extending outward to form bearings for the roller 25, and 26 is a similar though larger roller, likewise journaled in the arms 24 24', and having its projecting end 27 journaled in the cross-head 28, the end extending through and provided with a pulley, 29.

30 30 are flexible endless tapes passing around the rollers 25 and 26, and it will be seen that if motion be communicated to the pulley 29 the rollers 25 and 26 and tapes are set in motion.

31 is a loose pulley on the cross-head 28, and 32 is a similar loose pulley on the shaft 17.

33 is an endless band or cord passing around the pulley K, thence separately over the loose pulleys 31 and 32, so as to encircle 29 on the roller 26 in the direction of the arrows shown in Fig. 11.

When the fly is in position to receive a sheet of paper from the press, the band 33 is taut, and the rollers 25 and 26 and tapes 30 are in motion and draw the sheet down upon the body of the fly. When, however, the fly begins to move away from the cylinder, the position of the pulleys 29 and 31 changes, so as to gradually slacken the band 33, and by the time the fly has moved one-quarter of its distance the band has become so slackened that all motion of the pulley 29, rollers 25 and 26, and tapes 30 have ceased, and the sheet retains its place where it is left by the stoppage of the tapes, and in this position is delivered to the table before mentioned.

The delivery motion of the fly is communicated through a pinion, 34, secured to one end of the shaft 17, and meshing in a rack, 35, secured to one end of a bar, 36, having a reciprocating motion in guides 37 and 37', secured to the side of the frame C. The other end of this bar 36 has a friction-roller, 38, which comes in contact with a cam, 39, on the cylinder-shaft Q, and the bar is held in contact therewith by the spiral spring 40'. The operation of the cam is such that as the cylinder revolves the bar 36 is forced outwardly from the center, and the spring 40 draws it in. This gives a to and-fro motion to the rack 35, and it in turn gives a rocking motion to the shaft 17, through the medium of the pinion 34, and this rocking motion is such as will put the fly in position to receive the printed sheet from the press, the fly remaining there long enough to accomplish this, then move the fly over to deliver the sheet to the table and return to its first position to receive a new sheet. The proper timing of this motion of the fly with reference to the cylinder is accomplished by the contour of the face of the cam 39, and the rack 35 being set at an incline to the pinion 34 by removing the pin 21 the pinion 34 is released from the rack, and the whole fly-frame may be thrown out of the way, as stated above, to allow the operator to gain access to all parts of the form when the bed is at that end of the press.

The ink-reservoir is designated by the number 40, and is located at the forward end of the press. It consists of a base, 41, having sides 42 and 43, and one end, 44, extends outwardly, through which a hand-screw, 45, passes to secure it to the arm 46, which is secured to the frame C. This screw 45 acts as a pivot or hinge, so that the fountain may be swung on it horizontally to clear the bed or platen.

The ink-fountain is not claimed in this case, as it will be made the subject-matter of a separate application.

Having thus fully described my invention, what I claim as new and useful, and desire to secure by Letters Patent of the United States, is—

1. The combination, with the cylinder P, gear N, and bed O, having racks P', of the mutilated gear E, shaft F, having rigidly secured thereto the gears G, H, L, and M, and loosely mounted thereon the gears I and J, as set forth.

2. The combination, with the frame B C, having secured thereto the cam V, of the cylinder P, lever R, spring $u$, rack S and roller U, and the shaft T, pinion $s$, fingers 2, jaw 4, stop 5, and spring 3, as set forth.

3. The combination, with the shaft T, having springs 3 and fingers 2, of the jaw 4 and stop 5, as set forth.

4. The combination, in a printing-press, of a fly fulcrumed upon a shaft at one end of the press, a pinion on one end of said fulcrum-shaft, a reciprocating rack-bar meshing with said pinion, and suitable driving mechanism, substantially as set forth.

5. The combination, with the hinged fly 16 and pinion 34, of the rack-bar 35 36, and arm 19, having slot 20, and pin 21, as set forth.

In testimony whereof I affix my signature in presence of two witnesses.

HERVEY B. DENNY.

Witnesses:
 CHAS. H. BAKER,
 H. J. ENNIS.